(12) United States Patent
Sugimoto et al.

(10) Patent No.: US 7,484,753 B2
(45) Date of Patent: Feb. 3, 2009

(54) AIRBAG SYSTEM

(75) Inventors: Shinichi Sugimoto, Tokyo (JP); Akifumi Takedomi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/522,471

(22) Filed: Sep. 18, 2006

(65) Prior Publication Data
US 2007/0080523 A1 Apr. 12, 2007

(30) Foreign Application Priority Data
Oct. 6, 2005 (JP) .............................. 2005-294218

(51) Int. Cl.
B60R 21/16 (2006.01)

(52) U.S. Cl. .................................. 280/730.1
(58) Field of Classification Search .............. 280/730.1, 280/728.2
See application file for complete search history.

(56) References Cited

U.S. PATENT DOCUMENTS

| | | | |
|---|---|---|---|
| 5,738,407 A | 4/1998 | Locke | |
| 5,934,750 A * | 8/1999 | Fohl | 297/216.12 |
| 6,572,137 B2 | 6/2003 | Bossecker et al. | |
| 7,004,496 B2 | 2/2006 | Bossecker et al. | |
| 7,040,651 B2 | 5/2006 | Bossecker et al. | |
| 7,150,468 B2 * | 12/2006 | Pan | 280/730.1 |
| 2002/0014760 A1 * | 2/2002 | Bossecker et al. | 280/730.1 |
| 2004/0075252 A1 * | 4/2004 | Pan | 280/730.1 |
| 2004/0113402 A1 * | 6/2004 | Bossecker et al. | 280/730.2 |
| 2005/0173898 A1 * | 8/2005 | Yoshikawa et al. | 280/729 |

FOREIGN PATENT DOCUMENTS

| | | |
|---|---|---|
| DE | 28 41 729 | 4/1980 |
| DE | 202 16 611 U1 | 2/2003 |
| DE | 102 36 373 A1 | 2/2004 |
| DE | 102 48 532 A1 | 4/2004 |
| EP | 1 400 415 A2 | 3/2004 |

OTHER PUBLICATIONS

U.S. Appl. No. 11/522,463, filed Sep. 18, 2006, Shinichi Sugimoto et al.

Anonymous: "Occupant Protection Devices for Vehicle Rollover", Research Disclosure, Mason Publications, vol. 407, No. 49, Mar. 1998, XP007122445, 5 pages.

* cited by examiner

Primary Examiner—Faye M. Fleming
(74) Attorney, Agent, or Firm—Foley & Lardner LLP

(57) ABSTRACT

The airbag system includes an airbag constituted by a bag formed of a first panel and a second panel stitched together, and is disposed in a car seat so as to inflate above the head of an occupant at inflation. The airbag system also includes an inflator disposed on a seat frame of the seat and supplying gas for inflating the airbag. The airbag system is stable and has a flexible layout.

6 Claims, 5 Drawing Sheets

AIRBAG SYSTEM

BACKGROUND

The present invention relates to an airbag system to be mounted to vehicles such as cars.

Various airbag systems, such as driver airbags that inflate from the rotational center of handles toward drivers and passenger airbags that inflate from instrument panels to passengers, have been generally used to restrain occupants' bodies in car collisions an so on.

In the event of accidents in which a large external force is applied to cars, such as turnovers due to crashes and the fall of heavy bodies such as fallen trees, an impact may be given onto occupants' heads from above the occupants' heads. Thus, airbag systems to cope with such situations have been proposed (for example, refer to JP-A-2002-37011, which is incorporated by reference herein in its entirety).

SUMMARY

One embodiment of the invention relates to an airbag system. The airbag system comprises an airbag including joined base fabrics and disposed in a car seat so as to deploy above an occupant's head at inflation; and an inflator disposed on the frame of the seat and supplying pressure fluid for inflating the airbag Another embodiment of the invention relates to an occupant restraint device. The device comprises: an airbag disposed in a vehicle seat and configured to inflate above an occupant's head; and an inflator to inflate the airbag and disposed in the vehicle seat below the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 (*a*) illustrates the airbag prior to inflation and FIG. 1 (*b*) illustrates the airbag during inflation.

DETAILED DESCRIPTION

Figure 1A:
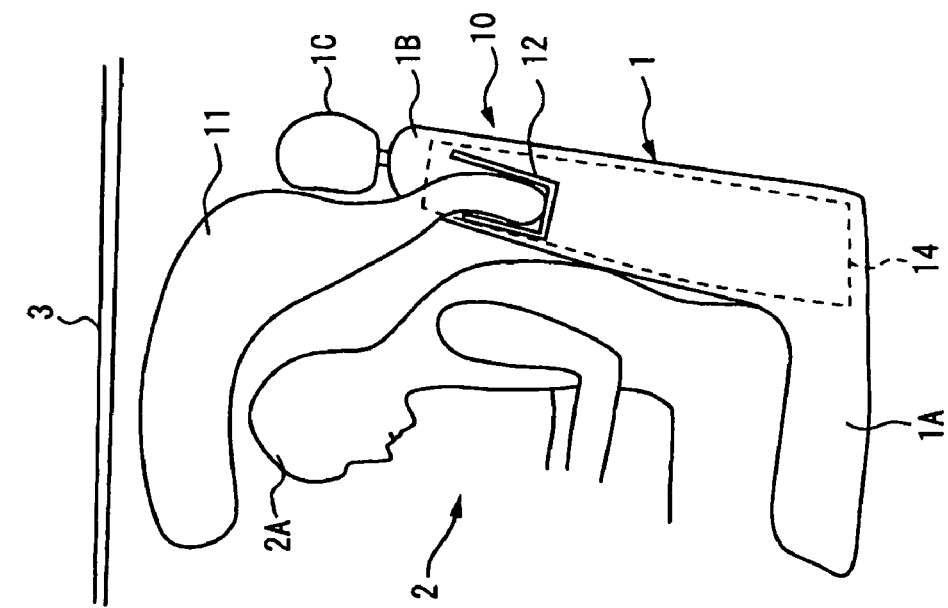
FIGS. 1 (*a*) and 1 (*b*) are schematic side views of a car seat including an embodiment of an airbag system according to the invention.

The related art discloses a principal structure in which an airbag constituted by a bag made of joined base fabrics is housed in a seatback (or a headrest) of a vehicle, and pressure fluid from an inflator is supplied into the airbag in an emergency to deploy it above occupants' heads.

Optimizing the airbag system requires improving stability and the flexibility of layout.

Accordingly, it is an object of at least one embodiment of the present invention to provide a technique effective in improving the stability of the entire airbag system and the flexibility of layout.

A first embodiment of the invention includes an airbag constituted by a bag formed of joined base fabrics and disposed in a car seat so as to deploy above an occupant's head at inflation; and an inflator disposed on the frame of the seat and supplying pressure fluid for inflating the airbag.

When pressure fluid is supplied from the inflator to the airbag, the airbag inflates to deploy above an occupant's head, thereby restraining the upward movement of the occupant's head. The first embodiment is constructed such that the inflator is not integrated with the airbag but is disposed on the frame of the seat. This enables the inflator to be disposed apart from the airbag, which is generally disposed at the upper part of the seat for the above-described deployment, such as below the airbag. As a result, the center of gravity of the entire airbag system is lowered by disposing the relatively heavyweight inflator at a lower place, thus improving the stability. The disposing of the thick inflator at a lower place facilitates responding to the recent need for decreasing the thickness of the upper part of the backrest, thus increasing the flexibility of layout.

According to a second embodiment, the inflator of the first embodiment is disposed on the frame of the seat below the airbag.

The disposing of the inflator below the airbag enables the center of gravity of the entire airbag system to be lowered, thus improving the stability and flexibility of layout.

According to a third embodiment, the inflator of the second embodiment is disposed on the frame in the backrest of the seat.

The disposing of the inflator on the frame in the backrest enables the entire airbag system to be concentrated in the backrest, thus increasing ease of handling and assembling.

According to a fourth embodiment, in the airbag system according to one of the first to third embodiments, a retainer accommodating the airbag is disposed on the frame.

The holding of the airbag with the retainer on the frame enables the airbag to be secured to the frame.

According to a fifth embodiment, in the airbag system according to one of the first to fourth embodiments, the airbag and the inflator are joined together with a pipe.

This enables the pressure fluid from the inflator to be introduced into the airbag to inflate it while disposing the inflator and the airbag apart from each other.

The invention can improve the stability of the entire airbag system and the flexibility of layout.

An embodiment of the present invention will be described hereinbelow with reference to the drawings.

Figure 1B:
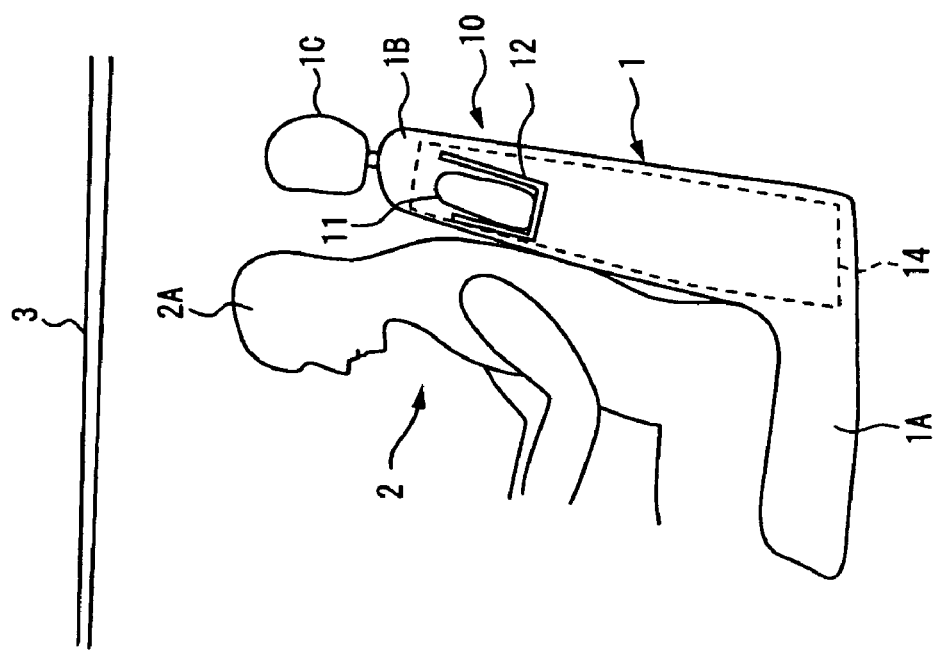

FIG. 1 is a schematic side view of a car seat 1 including an embodiment of the airbag system according to the invention, wherein FIG. 1 (*a*) shows a normal state, and FIG. 1 (*b*) shows a state in which an airbag inflates. Referring to FIG. 1, an occupant 2 is seated on the seat 1. The seat 1 has a seat portion 1A, from which a backrest 1B projects upward. A headrest 1C is mounted on the top of the backrest 1B.

The seat 1 is equipped with an airbag system 10 in the backrest 1B, for restraining the head 2A of the occupant 2 at the turnover of the vehicle body in an accident. The airbag system 10 includes: an airbag 11 constituted by a bag 35 (see FIG. 5) formed of a first panel 35A and a second panel 35B (see FIG. 5) stitched together and deploying above the head 2A of the occupant 2 at inflation; a retainer 12 that accommodates the airbag 11 in a folded state; and an inflator 13 (see FIGS. 2 and 3) that supplies gas (pressure fluid) for inflating the airbag 11. The seat 1 contains a seat frame 14 (frame) constructed of side plates 14A (see FIG. 2) and a cross member 14B (see FIG. 2) to form the frame of the seat 1. The retainer 12 and the inflator 13 are disposed on the seat frame 14 (the details will be described later). The inflator 13 is ignited under the control of a control unit (not shown).

Referring to FIG. 1 (a), the airbag 11 is normally housed in a folded state in the retainer 12. For example, when the car turns over, the inflator 13 of the airbag system 10 is ignited by the control unit (not shown) to deploy the airbag 11 between a roof 3 of the car and the head 2A of the occupant 2, as shown in FIG. 1 (b). At that time, the airbag 11 inflates so as to push the head 2A of the occupant 2 forward by the action of subbags 1B (see FIGS. 4 and 5) to bend the head 2A of the occupant 2 forward, thereby reducing a load on the neck.

Figure 2:
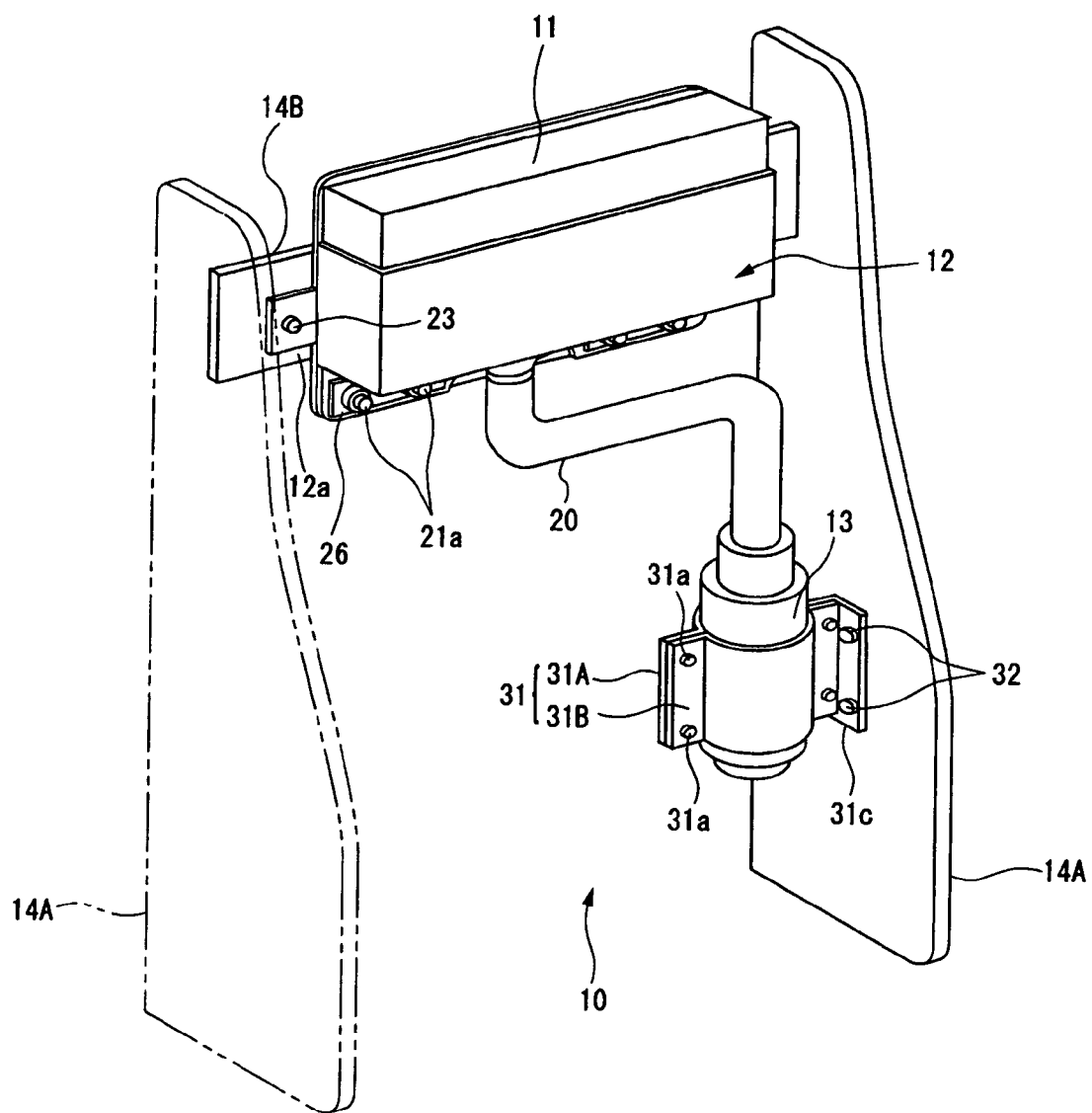
FIG. 2 is a perspective view of a structure of fixing the embodiment of the airbag system according to the invention to a seat frame.
Figure 3:
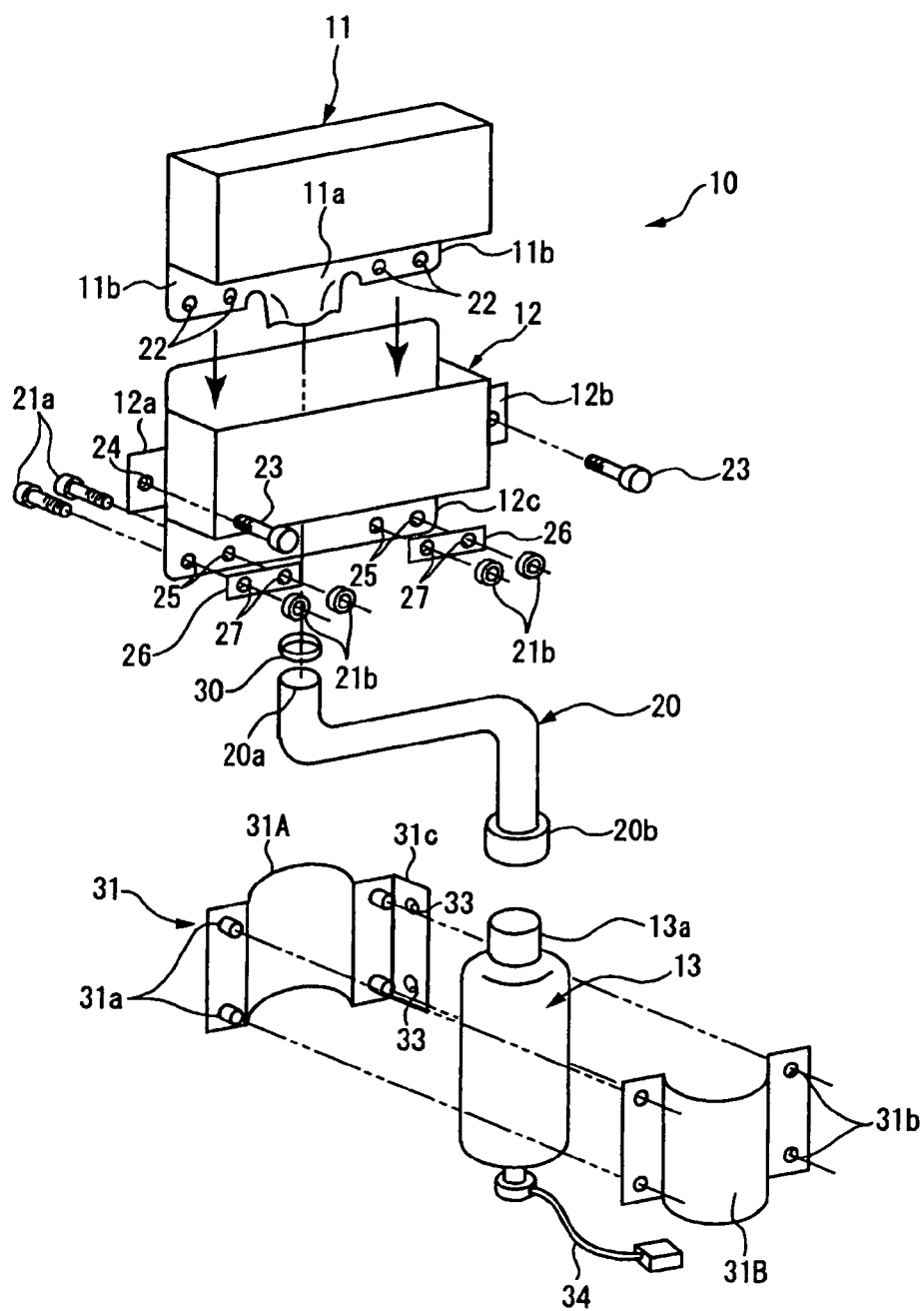
FIG. 3 is an exploded perspective view of the airbag system, showing the further details on the fixing structure of FIG. 2.

FIG. 2 is a perspective view of a structure of fixing the airbag system 10 to the seat frame 14. FIG. 3 is an exploded perspective view of the airbag system 10, showing the further details on the fixing structure.

Referring to FIGS. 2 and 3, the seat frame 14 includes the pair of side plates 14A and 14A disposed on both sides of the backrest 1B of the seat 1 in the vehicle width direction (on the right and left sides in FIG. 2) and the cross member 14B bridged between the side plates 14A and 14A across the width of the vehicle to connect them. Both of the side plates 14A and the cross member 14B are disposed in the backrest 1B. The seat frame 14 also includes a base plate (not shown) disposed in the seat portion 1A.

The airbag 11 has a gas feed port 11a connected to the inflator 13 via a pipe 20 and mounting pieces 11b and 11b on both sides of the gas feed port 11a at the base end of the airbag 11 (adjacent to the inflator, at the bottom in FIG. 3). The mounting pieces 11b and 11b each have two bolt holes 22 in which mounting bolts 21a for fixing the airbag 11 to the retainer 12 are to be passed through. The retainer 12 has mounting portions 12a and 12b in the vehicle width direction, each having a bolt hole 24 for a mounting bolt 23 for fixing the retainer 12 to pass through. The retainer 12 also has a mounting portion 12c at the lower part thereof (adjacent to the inflator, at the bottom in FIG. 3), the mounting portion 12c having bolt holes 25 in positions corresponding to the bolt holes 22 of the mounting pieces 11b.

With the airbag 11 housed in a folded state in the retainer 12, the plurality of (four in this embodiment) mounting bolts 21a are inserted into the bolt holes 25 of the retainer mounting portion 12c, the bolt holes 22 of the airbag mounting pieces 11b and 11b, and bolt holes 27 of mounting plates 26 provided at the positions corresponding to the bolt holes 22 of the airbag mounting pieces 11b, and are tightened with nuts 21b. Thus, the airbag 11 is fixed to the retainer 12 in a folded state. The plurality of (two in this embodiment) mounting bolts 23 pass through the bolt holes 24 of the retainer mounting portions 12a and 12b, and are then tightened in holes (not shown) of the cross member 14B. Thus, the retainer 12 in which the airbag 11 is housed in a folded state is secured to the cross member 14B.

The pipe 20 is made of metal or the like and is bent at a plurality of places (two places in this embodiment), and is disposed under the retainer 12. The pipe 20 and the airbag 11 are joined together in such a manner that the gas feed port 11a of the airbag 11 is put on the bag-side end 20a of the pipe 20 and swaged together with a clamp band 30 made of metal or the like. The pipe 20 and the inflator 13 are joined together in such a manner that a connecting portion 20b of the pipe 20 adjacent to the inflator 13 is put on the upper end 13a of the inflator 13 and bonded (welded) together. Thus, the airbag 11 and the inflator 13 are joined together with the pipe 20.

The inflator 13 is disposed under the pipe 20, and is mounted to one of the side plates 14A (in this embodiment, on the right in the vehicle width direction) with a mounting member 31. The mounting member 31 has a pair of mounting plates 31A and 31B that clamp the inflator 13 to support it. The mounting plates 31A and 31B are riveted to each other with the inflator 13 therebetween in such a manner that a plurality of (four in the embodiment) rivets 31a of the mounting plate 31A are inserted into a plurality of (four in this embodiment) rivet holes 31b provided at corresponding positions of the mounting plates 31B. The mounting plate 31A has a mounting portion 31c at one side (on the right in the vehicle width direction) which is bent substantially at 90 degrees. A plurality of (two in the embodiment) mounting bolts 32 are inserted into bolt holes 33 of the mounting portion 31c and are then secured in fastening holes (not shown) of the side plate 14A so that the mounting member 31 is secured to the side plate 14A. Thus, the inflator 13 is secured to the side plate 14A with the mounting member 31.

The inflator 13 and the above-mentioned control unit (not shown) are connected together with a cable 34. The ignition of the inflator 13 is controlled via the cable 34.

Figure 4:
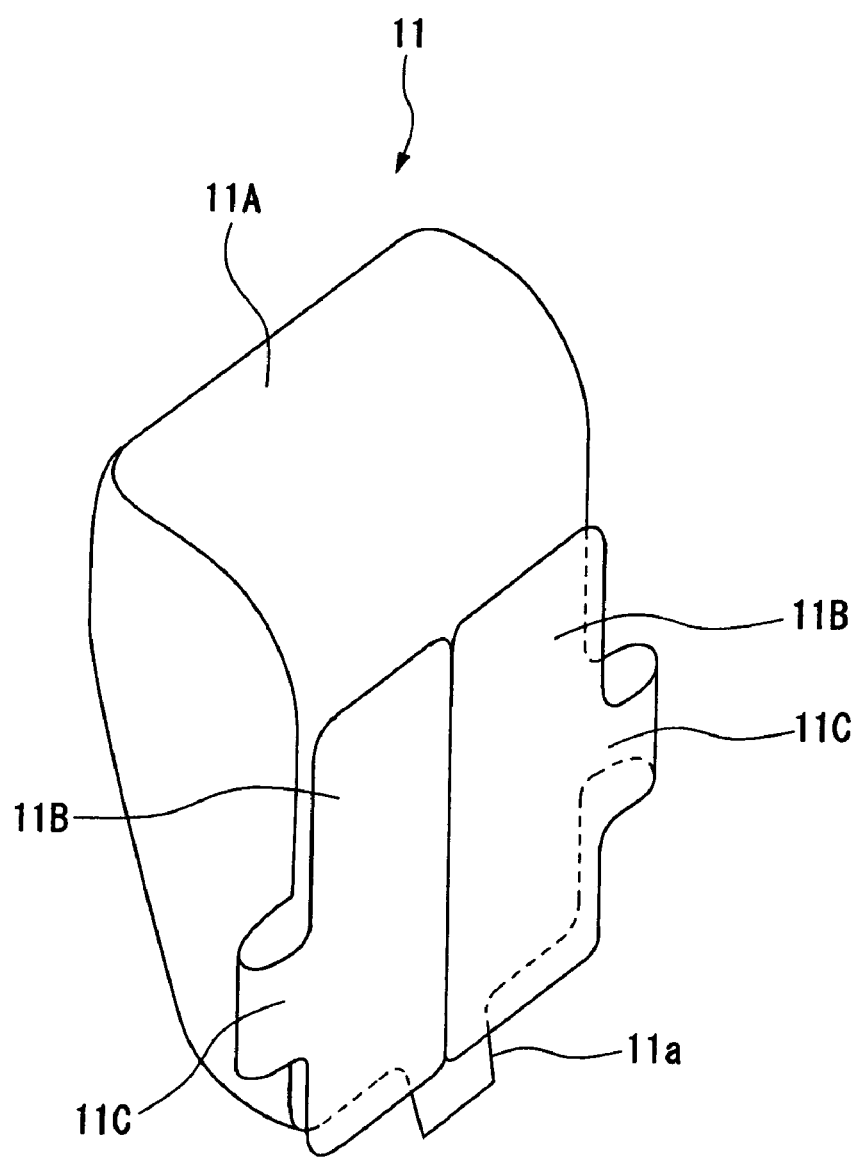
FIG. 4 is a perspective view of the entire structure of the airbag halfway through inflation.

FIG. 4 is a perspective view of the entire structure of the airbag 11 halfway through inflation (in a state in which a main chamber inflates).

Referring to FIG. 4, the airbag 11 includes a main bag 11A that contains a main chamber (to be described later) and inflates above the head 2A of the occupant 2, and a pair of subbags 11B and 11B each containing a subchamber 43 (to be described later), disposed opposite to the occupant 2 relative to the main bag 11A (adjacent to the rear of the vehicle, on the right in the drawing), which inflates to push the main bag 11A toward the occupant 2 (to the front of the vehicle, to the left in the drawing), thereby bending the head 2A of the occupant 2 forward. The main bag 11A and the subbags 11B and 11B are joined together with communicating portions 11C and 11C each having a communicating path 44 (to be described later) therein. The main bag 11A has the gas feed port 11a at the bottom thereof. The gas ejected from the inflator 13 passes through the pipe 20 and the gas feed port 11a into the main chamber 42 in the main bag 11A, and passes through the communicating paths 44 and 44 in the communicating portions 11C and 11C into the subchambers 43 and 43. FIG. 4 shows a state in which the gas supplied from the inflator 13 flows into the main chamber 42 to inflate the main bag 11A.

The airbag 11 including the main bag 11A and the subbags 11B are constructed as a single bag 35 formed of a first panel 35A (base fabric) (not shown) adjacent to the occupant 2 (adjacent to the front of the vehicle) and a second panel 35B (base fabric) opposite to the occupant 2 (adjacent to the rear of the vehicle) stitched together.

Figure 5:
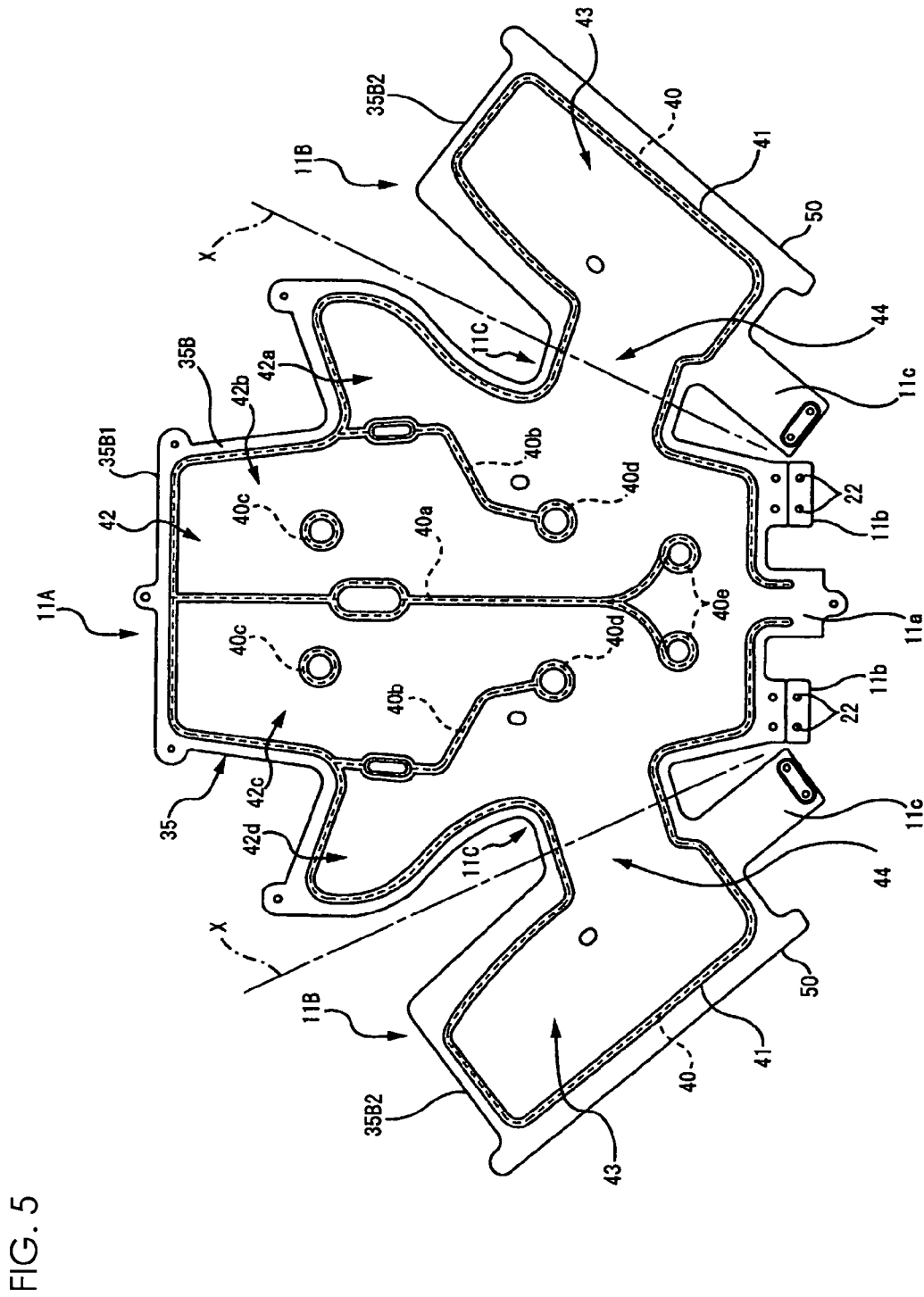
FIG. 5 is a plan view of the entire structure of a bag, as viewed from a second panel.

FIG. 5 is a plan view of the entire structure of the bag 35 before folded (in a state before the subbags 11B shown in FIG. 4 are folded into the back of the main bag 11A), as viewed from the second panel 35B.

As shown in FIG. 5, the bag 35 is constructed as one bag such that the first panel 35A and the second panel 35B in substantially the same shape (FIG. 5 shows only the second panel 35B) are stitched together across the entire periphery except the gas feed port 11a. Numeral 40 indicates the seam thereof, and numeral 41 denotes a sealing member disposed along the seam 40 to seal it.

The second panel 35B includes a substantially trapezoidal main bag portion 35B1 expanding from the gas feed port 11a (on the bottom in the drawing) toward the opposite side (to the top in the drawing) and a pair of subbag portions 35B2 and 35B2 disposed on a first side (on the right in the drawing) and a second side (on the left in the drawing). The first panel 35A also has substantially the same shape as the second panel 35B. The first panel 35A and the second panel 35B with this shape are stitched together along the entire periphery except the gas feed port 11a, as described above, so that the main chamber 42, the pair of subchambers 43 and 43 disposed on the first side (on the right in the drawing) and the second side (on the left in the drawing) of the main chamber 42, and the communicating paths 44 and 44 that communicate the main chamber 42 and the subchambers 43 and 43 with each other are formed between the first panel 35A and the second panel 35B. Thus, the main chamber 42, the subchambers 43 and 43, and the communicating paths 44 and 44 are disposed such that the outer rims thereof are enveloped with the continuous seam 40 and the sealing member 41 as a whole.

The main chamber 42 has four chambers 42a, 42b, 42c, and 42d formed by a seam 40a substantially extending along the gas flowing direction substantially in the center thereof and seams 40b and 40b on both sides of the seam 40a (on the right and left in the drawing). This arrangement enables the gas supplied through the gas feed port 11a to be introduced smoothly in a downstream direction of the main chamber 42 (to the above in the drawing).

The bag 35 with the above structure is manufactured in such a manner that: the outer rims of the first panel 35A and the second panel 35B are first stitched together along the seam 40 with the panels 35A and 35B placed one on another, and the panels 35A and 35B are stitched along the seams 40a and 40b, and seams 40c, 40d, and 40e, and are then folded along the fold lines X so that the subbags 11B and 11B on both sides are moved opposite to the occupant 2 (adjacent to the rear of the vehicle) relative to the main bag 11A, as shown in FIG. 4; and the subbags 11B and 11B are stitched together (ends 50 and so on are stitched together) to hold the state; and thereafter, the rims of the subbags 11B and 11B (the parts outside the seam 40) and the center of the main bag 11A are stitched together to hold the subbags 11B and 11B in the folded state. The airbag 11 is housed in the folded state in the retainer 12. At that time, mounting pieces 11c provided at the base end of the subbags 11B (on the bottom in FIG. 5) containing the subchambers 43 and the above-mentioned mounting pieces 11b are placed one on another, and the mounting bolts 21a are passed through both of the mounting pieces 111b and 11c.

The airbag system 10 of the embodiment with the above structure offers the following advantages.

The airbag system 10 of the embodiment is constructed such that the inflator 13 is not integrated with the airbag 11, but is mounted to the seat frame 14 (side plate 14A) of the seat 1. This enables the inflator 13 to be disposed apart from the airbag 11, which is generally disposed at the upper part of the seat for deployment, or below the airbag 11 as in the embodiment. As a result, the center of gravity of the entire airbag system 10 is lowered by disposing the relatively heavyweight inflator 13 at a lower place, thus improving the stability. Since the thick inflator 13 is placed at a lower place, the upper part of the backrest 1B of the seat 1 can be decreased in thickness, thus responding to the recent need, e.g., for decreasing the thickness of the backrests of the driver's seat and the passenger's seat to increase the space for the rear seat. Furthermore, since the upper part of the backrest 1B has a limitation to layout because a pipe for supporting the headrest 1C is generally disposed at the upper part of the backrest 1B or, particularly an active headrest, in which the headrest 1C is movable and has a driving unit. In contrast, the embodiment disposes the thick inflator 13 at a lower place, thereby increasing the flexibility of layout.

According to the embodiment, the inflator 13 is disposed on the seat frame 14 (side plate 14A) in the backrest 1B of the seat 1, as described above. This enables the entire airbag system 10 to be concentrated in the backrest 1B, increasing ease of handling and assembling.

According to the embodiment, the retainer 12 that houses the airbag 11 is disposed on the seat frame 14 (cross member 14B), as described above. This enables the airbag 11 to be secured to the seat frame 14, or the frame of the seat 1, thus allowing the reaction force and so on during inflation to be received sufficiently.

According to the embodiment, the airbag 11 and the inflator 13 are joined together with the pipe 20, as described above. This enables the inflator 13 to be freely disposed by disposing the inflator 13 and the airbag 11 apart from each other and bending the pipe 20. This further increases the flexibility of layout.

According to the embodiment, the inflator 13 is mounted to the side plate 14A in the backrest 1B of the seat 1. Alternatively, for example, the inflator 13 may be disposed on the base plate (not shown) in the seat portion 1A of the seat 1. This also offers the same advantages as the foregoing embodiment.

According to the embodiment, the mounting member 31 for securing the inflator 13 to the side plate 14A clamps the inflator 13 from both sides in the front-back direction with the two mounting plates 31A and 31B. Alternatively, for example, the inflator 13 may be clamped in the vehicle width direction with the two mounting plates 31A and 31B. In this case, for example, it is sufficient to provide the side plate 14A with a projecting support for fixing the mounting plates 31A and 31B to the side plate 14A, and to secure the mounting plates 31A and 31B to the support. It is not always necessary to clamp the inflator 13 with the two mounting plates, as in the foregoing embodiment, but the inflator 13 may be secured directly to the side plate 14A only with one mounting plate. In other words, the inflator 13 may be clamped with the mounting plate and the side plate 14A. This also offers the same advantages as the embodiment.

According to the embodiment, the first panel 35A and the second panel 35B are stitched together to form the airbag 11 (bag 35), as described above. Alternatively, for example, the first panel 35A and the second panel 35B are joined by another joining mechanism such as hollow weave.

Japan Priority Application 2005-294218, filed Oct. 6, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag system, comprising:
   an airbag including joined base fabrics and disposed in a vehicle seat so as to deploy above an occupant's head at inflation;
   an inflator disposed on a frame of the seat and supplying pressure fluid for inflating the airbag; and
   a retainer to hold the airbag, the retainer being disposed on the frame of the seat, wherein the retainer for the airbag is mounted to a cross member bridging two side plates in the vehicle seat and the inflator is mounted to only one side plate below the retainer.

2. An airbag system comprising:

an airbag including joined base fabrics and disposed in a vehicle seat so as to deploy above an occupant's head at inflation;

an inflator disposed on a frame of the seat and supplying pressure fluid for inflating the airbag; and a retainer to hold the airbag, the retainer being disposed on the frame of the seat, wherein the airbag and the inflator are joined together with a pipe; and wherein the pipe includes at least one bent portion.

3. An airbag system, comprising:

an airbag configured to deploy above an occupant's head while sitting in a vehicle seat; and an inflator for supplying inflation fluid to the airbag, wherein the inflator is connected to a frame portion of the vehicle seat below and separate from the airbag thereby lowering the center of gravity for the airbag system and reducing the thickness of an upper portion of the vehicle seat, wherein a retainer for the airbag is mounted to a cross member bridging two side plates in the vehicle seat and the inflator is mounted to only one side plate below the retainer.

4. An occupant restraint device comprising:

an airbag disposed in a vehicle seat and configured to inflate above an occupant's head; and an inflator to inflate the airbag and disposed in the vehicle seat below the airbag, wherein the inflator is mounted to a frame of the vehicle seat; and wherein the inflator is mounted to one side plate by an inflator mounting member, the mounting member clamps the inflator from both sides in the front to back direction with two mounting plates.

5. An occupant restraint device comprising:

an airbag disposed in a vehicle seat and configured to inflate above an occupant's head; and an inflator to inflate the airbag and disposed in the vehicle seat below the airbag, wherein the inflator is mounted to a frame of the vehicle seat, and wherein the inflator is mounted to one side plate by a mounting member, the mounting member clamps the inflator from both sides in a vehicle width direction.

6. An occupant restraint device, comprising:

an airbag disposed in a vehicle seat and configured to inflate above an occupant's head;

an inflator to inflate the airbag and disposed in the vehicle seat below the airbag; and a retainer for holding the airbag, the retainer being disposed on a frame, wherein the inflator is mounted to the frame of the vehicle seat, wherein the inflator is disposed on the frame of the seat below the airbag, and wherein the retainer for the airbag is mounted to a cross member bridging two side plates in the vehicle seat and the inflator is mounted to only one side plate below the retainer.

* * * * *